(12) United States Patent
Lee et al.

(10) Patent No.: US 12,523,617 B2
(45) Date of Patent: Jan. 13, 2026

(54) AUTONOMOUS INSPECTION OF A SURFACE TOPOLOGY OF AN AIRFOIL OF A GAS TURBINE ENGINE

(71) Applicant: RTX Corporation, Farmington, CT (US)

(72) Inventors: Jeremiah Lee, Coventry, CT (US); Sheridon Haye, College Station, TX (US)

(73) Assignee: RTX Corporation, Farmington, CT (US)

( * ) Notice: Subject to any disclaimer, the term of this patent is extended or adjusted under 35 U.S.C. 154(b) by 113 days.

(21) Appl. No.: 18/592,174

(22) Filed: Feb. 29, 2024

(65) Prior Publication Data

US 2025/0277751 A1    Sep. 4, 2025

(51) Int. Cl.
*G01N 21/95* (2006.01)
*F02C 7/32* (2006.01)

(52) U.S. Cl.
CPC .............. *G01N 21/95* (2013.01); *F02C 7/32* (2013.01); *G01N 2201/104* (2013.01)

(58) Field of Classification Search
CPC ............. G01N 21/95; G01N 2201/104; G01N 21/9515; F02C 7/32; G01B 5/205; G01B 5/207; G01B 11/24; G01B 3/14; G01B 5/20; G01B 5/213; B60C 11/00; B60C 3/00

(Continued)

(56) References Cited

U.S. PATENT DOCUMENTS

| 5,191,791 A | 3/1993 | Gerardi et al. |
| 7,653,235 B2 | 1/2010 | Mylaraswamy et al. |

(Continued)

FOREIGN PATENT DOCUMENTS

| CN | 112896354 B | 4/2022 |
| JP | S55100104 U | 7/1980 |

(Continued)

OTHER PUBLICATIONS

Extended European Search Report dated Jul. 9, 2025, for corresponding European Patent Application No. 25160063.1, 4 pgs.

(Continued)

*Primary Examiner* — Isiaka O Akanbi
(74) *Attorney, Agent, or Firm* — Kinney & Lange, P.A.

(57) ABSTRACT

Apparatus and associated methods relate to autonomous devices configured to map surface topologies of airfoils of gas turbine engines. The autonomous device moves across the airfoil while remaining coupled thereto while sensing the surface topology of the airfoil using an optical gel sensor via an array of airfoil contacting members. The optical gel sensor includes an optical gel, having nominally planar opposite surfaces defining a nominal gel thickness extending over an image area. A lighting element illuminates the optical gel from an end of the flexible optical gel. A plurality of airfoil contacting members extend between the flexible optical gel and the airfoil, thereby distorting the flexible optical gel in response to changes in the surface topology of the airfoil. A two-dimensional imager images the flexible optical gel over the image area, thereby creating a two-dimensional image that is indicative of the surface topology.

20 Claims, 6 Drawing Sheets

(58) Field of Classification Search
USPC .......................................... 356/237.2–237.6
See application file for complete search history.

(56) References Cited

U.S. PATENT DOCUMENTS

| | | | |
|---|---|---|---|
| 7,703,327 | B2 | 4/2010 | Georgeson et al. |
| 8,151,643 | B2 | 4/2012 | De Smet |
| 8,605,272 | B2 * | 12/2013 | Mercier .................. G01M 9/08 356/138 |
| 9,255,909 | B2 | 2/2016 | Kollgaard et al. |
| 9,334,066 | B2 | 5/2016 | Tapia et al. |
| 10,048,064 | B2 * | 8/2018 | Munro .................... G01S 17/42 |
| 10,468,545 | B1 | 11/2019 | Yang |
| 2011/0178727 | A1 | 7/2011 | Hafenrichter et al. |
| 2017/0052024 | A1 * | 2/2017 | Reece, Jr. ............... G01B 11/24 |
| 2021/0122478 | A1 * | 4/2021 | Mackin .................. B64D 13/06 |
| 2021/0302248 | A1 * | 9/2021 | Alspach ............... G01B 11/165 |
| 2021/0302255 | A1 * | 9/2021 | Alspach .................. G01L 25/00 |
| 2023/0024295 | A1 * | 1/2023 | Godbole .................. F01D 5/005 |
| 2025/0117012 | A1 * | 4/2025 | Haye ...................... G01M 15/14 |
| 2025/0152040 | A1 * | 5/2025 | Rohaly .................. H04N 23/56 |
| 2025/0277657 | A1 * | 9/2025 | Haye ................... G01M 5/0016 |

FOREIGN PATENT DOCUMENTS

| | | |
|---|---|---|
| JP | S57110405 U | 7/1982 |
| WO | 2023158840 A1 | 8/2023 |

OTHER PUBLICATIONS

Bazaei, Ali, et al., Displacement Sensing by Piezoelectric Transducers in High-Speed Lateral Nanopositioning. IEEE Sensors Journal, 2019, 19 (20), pp. 9156-9165. 10.1109/jsen.2019.2923428. hal-03224105, submitted May 11, 2021.

Extended European Search Report for European Patent Application No. 25160085.4, dated Aug. 26, 2025, 9 pages.

* cited by examiner

Human fingerprint

Cow leather texture

AUTONOMOUS INSPECTION OF A SURFACE TOPOLOGY OF AN AIRFOIL OF A GAS TURBINE ENGINE

BACKGROUND

Gas turbine engines are used in many, if not most, commercial aircraft as the source of propulsion. Such engines have many and various sets of airfoils, which are used to perform various functions. Many of these airfoils are grouped into disks (or stages) of airfoils that rotate at high rotational rates about an axis of these gas turbine engines. For example, compressor blades are rotating airfoils that are principally used to compress air before air enters a combustion chamber. Turbine blades are rotating airfoils that extract mechanical energy from the expanding gases of the combustion process to turn other blades, such as, for example, compressor blades and fan blades. Turbofan engines are gas turbine engines equipped with fan blades, which are rotating airfoils that provide much, if not most, of the propulsion generated by such turbofan engines. Many gas turbine engines also have non-rotating blades that are group into stages of airfoils as well. Such non-rotating blades, called stator blades, are non-rotating airfoils that control rotational direction of the gases within gas turbine engines so as to prevent stalling of the rotating airfoils and to increase efficiency of the gas turbine engines. Such non-rotating stages are often interposed between rotating stages.

During operation of gas turbine engines, these various airfoils can be worn and or damaged. Ingesting dust, ash, or larger foreign objects can result in abrasion, pitting, or destruction of these airfoils. Because the integrity of these airfoils is important for safe and effective operation of gas turbine engines, routine inspections thereof are performed. Some such inspections involve an inspector utilizing a borescope to assist visualization of these engine parts. When possible, the inspector might even crawl into the engine to visually inspect the engine and/or to drag his/her finger across each blade, in an attempt to feel for any imperfections. Calibrating the accuracy of such manual inspections can be difficult. In some examples, inspections are performed by cameras, which involves taking high resolution imagery, which can supplement human visual evaluation by performing computational image processing so as to be able to detect tiny defects that might be present. Such inspections are typically only performed during scheduled maintenance operations, due to the time required and equipment needed for thorough inspection.

SUMMARY

Some embodiments relate to an autonomous device for inspecting surface topology of an airfoil of a gas turbine engine. The autonomous device includes a base and means for coupling the base to the airfoil in a manner that permits movement of the base across the airfoil while remaining coupled thereto. The autonomous device includes means for moving the base across the airfoil while remaining coupled thereto. The autonomous device includes a tactile gel sensor extending from the base to the airfoil when the base is coupled thereto. The tactile gel sensor has a flexible optical gel having nominally planar opposite surfaces defining a nominal gel thickness extending over an image area. The tactile gel sensor has a lighting element configured to illuminate the flexible optical gel from an end surface between the nominally planar opposite surfaces of the flexible optical gel. The tactile gel sensor has a plurality of airfoil contacting member extending between one of the nominally planar opposite surfaces of the flexible optical gel and the airfoil when the base is coupled thereto, thereby distorting the flexible optical gel in response to changes in the surface topology of the airfoil. The tactile gel sensor also has a two-dimensional imager that captures images of the flexible optical gel over the image area, thereby creating a two-dimensional image. The autonomous device also has a surface topology calculator attached to the base and electrically connected tactile gel sensor and configured to locate defects in the surface topology of the airfoil based on the images captured by the tactile gel sensor.

Some embodiments relate to a method for inspecting surface topology of an airfoil of a gas turbine engine. The method includes adhering a base of an autonomous device to the airfoil in a manner that permits movement of the base across the airfoil while remaining coupled thereto. Then, the base of the autonomous device is moved across the airfoil while remaining coupled thereto. A tactile gel sensor extends from the base to the airfoil when the base is coupled thereto. The tactile gel sensor provides a flexible optical gel having nominally planar opposite surfaces defining a nominal gel thickness extending over an image area. A plurality of airfoil contacting members (e.g., feelers) extend between one of the nominally planar opposite surfaces of the flexible optical gel and the airfoil when the base is coupled thereto. A lighting element illuminates the flexible optical gel from an end surface between the nominally planar opposite surfaces of the flexible optical gel. The flexible optical gel is distorted in response to changes in the surface topology of the airfoil as transmitted to the flexible optical gel via the plurality of airfoil contacting members. The flexible optical gel is imaged over the image area by a two-dimensional optical imager, thereby capturing two-dimensional images. Then, defects in the surface topology of the airfoil are located by a surface topology calculator based on the two-dimensional images captured.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Inspecting airfoils of gas turbine engines more frequently than is permitted by regularly scheduled maintenance sessions would increase safety and longevity of such gas turbine engines. Such frequent inspections could be performed if such inspections could be quickly and easily performed while an aircraft is parked at a gate of an airport, for example. Such quick and easy inspections could be made possible if performed by small devices that could autonomously navigate across an airfoil of a gas turbine engine and quickly survey such an airfoil. By deploying a swarm of such small autonomous devices, many airfoils could be simultaneously surveyed. By using algorithms that do not require powerful processing engines, such small autonomous devices could possess processors capable of performing such algorithmic operations.

Apparatus and associated methods described herein relate to such autonomous devices configured to inspect surface topologies of airfoils of gas turbine engines. The autonomous device moves across the airfoil while remaining coupled thereto while sensing the surface topology of the airfoil using an optical gel sensor via an array of airfoil contacting members. The optical gel sensor includes an optical gel, typically captured in an elastic containment vessel having nominally planar opposite surfaces defining a nominal gel thickness extending over an image area. A lighting element illuminates the optical gel from an end of the elastic containment vessel. A plurality of airfoil contacting members extend between the elastic containment vessel and the airfoil, thereby distorting the elastic containment vessel in response to changes in the surface topology of the airfoil. A two-dimensional imager images the optical gel over the image area, thereby creating a two-dimensional image that is indicative of the surface topology.

Figure 1:
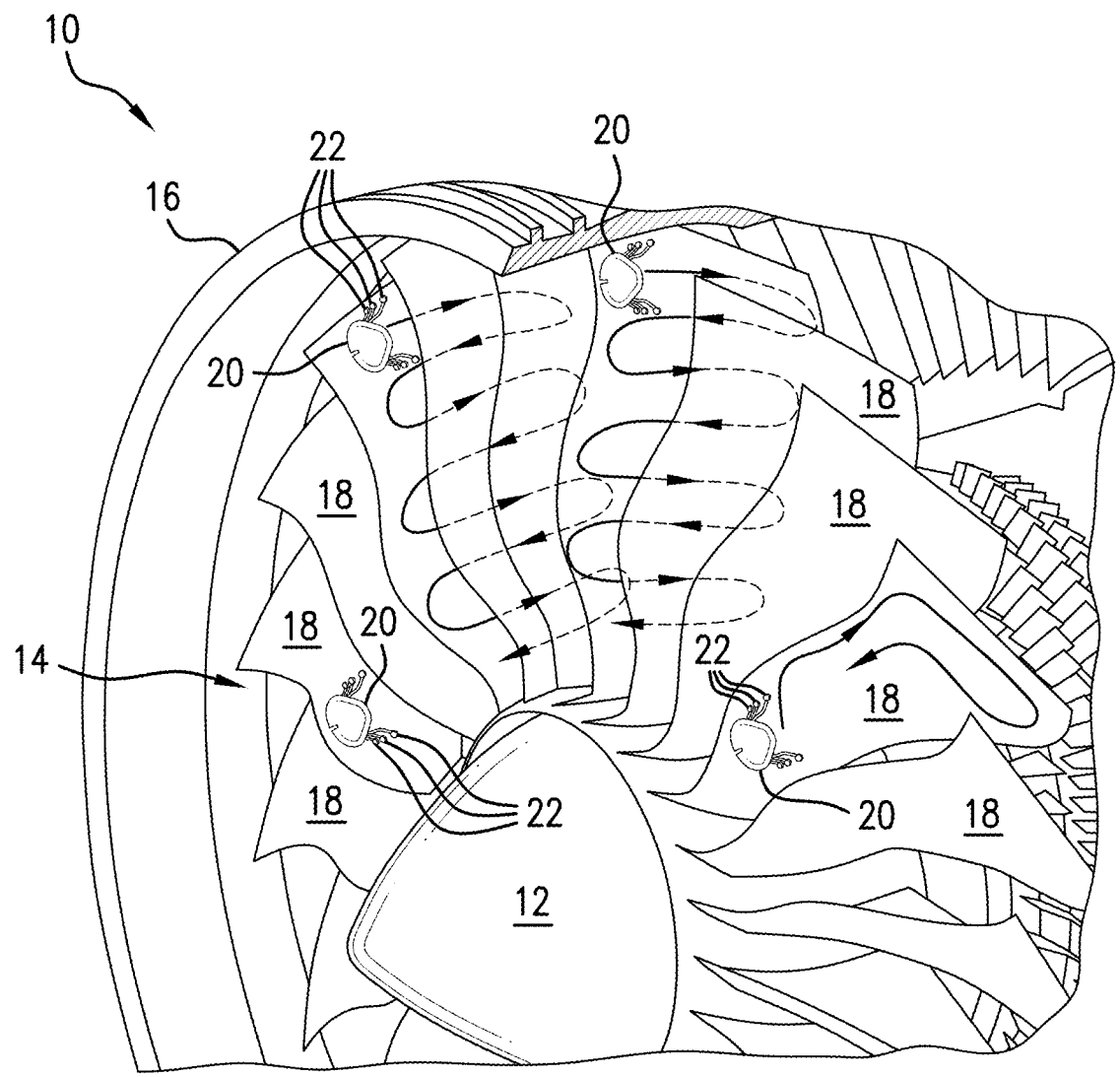
FIG. 1 is a perspective view of a swarm of autonomous devices inspecting surface topologies of fan blades of a gas turbofan engine.

FIG. 1 is a perspective view of a swarm of autonomous devices inspecting surface topologies of fan blades of a gas turbofan engine. In FIG. 1, gas turbofan engine 10 includes spinner 12, fan 14 and nacelle 16. Fan 14 includes a plurality of fan blades 18. Each of the swarm of autonomous devices 20 is coupled to a fan blade 18 in a manner that permits movement of autonomous device 20 across fan blade 18 while remaining coupled thereto. Autonomous devices 20 are configured to inspect surface topologies of the fan blades 18 to which autonomous devices 20 are coupled. To inspect the surface topologies, each autonomous device 20 has topological sensors that generate electrical signals indicative of the surface topology of fan blade 18 as autonomous device 20 traverses fan blade 18.

In the embodiment depicted in FIG. 1, each autonomous device 20 has legs 22 that move autonomous device 20 across fan blade 18. Legs 22 are configured to both couple autonomous device 20 to fan blade 18 and to move autonomous device 20 across fan blade 18. In some embodiments, legs 22 have suction cups that couple each autonomous device 20 to fan blade 18 using evacuated chambers with such suction cups. In other embodiments, legs 22 affix to fan blade 18 via an adhesive and/or via a contacting surface that couples using van der Waals forces. In the depicted embodiment, legs 22 can be articulated so as to push and/or pull autonomous device 20 across fan blade 18, and then be repositioned to a new location upon fan blades 18. Such alternative pushing/pulling and repositioning can be coordinated with coupling/uncoupling to fan blades 18. For example, miniature vacuum pumps (possibly manufactured by nano manufacturing techniques, using piezoelectric crystal vibrators, for example) can provide suction coupling of legs 22 to fan blade 18 while legs 22 are pushing and/or pulling autonomous device 20 across fan blade 18. Then, air can be provided to such suction cups to relieve suction while legs 22 are repositioned to new locations on fan blade 18. Such coordination of coupling and repositioning can be performed in a manner such that at least four of the six legs 22, as depicted in the FIG. 1 embodiment, are at all times providing coupling of autonomous device 20 to fan blade 18. Other means for moving autonomous device 20 across airfoil 18, such as fan blades 18, will be described below, with reference to FIGS. 3A and 3B.

Figure 2:
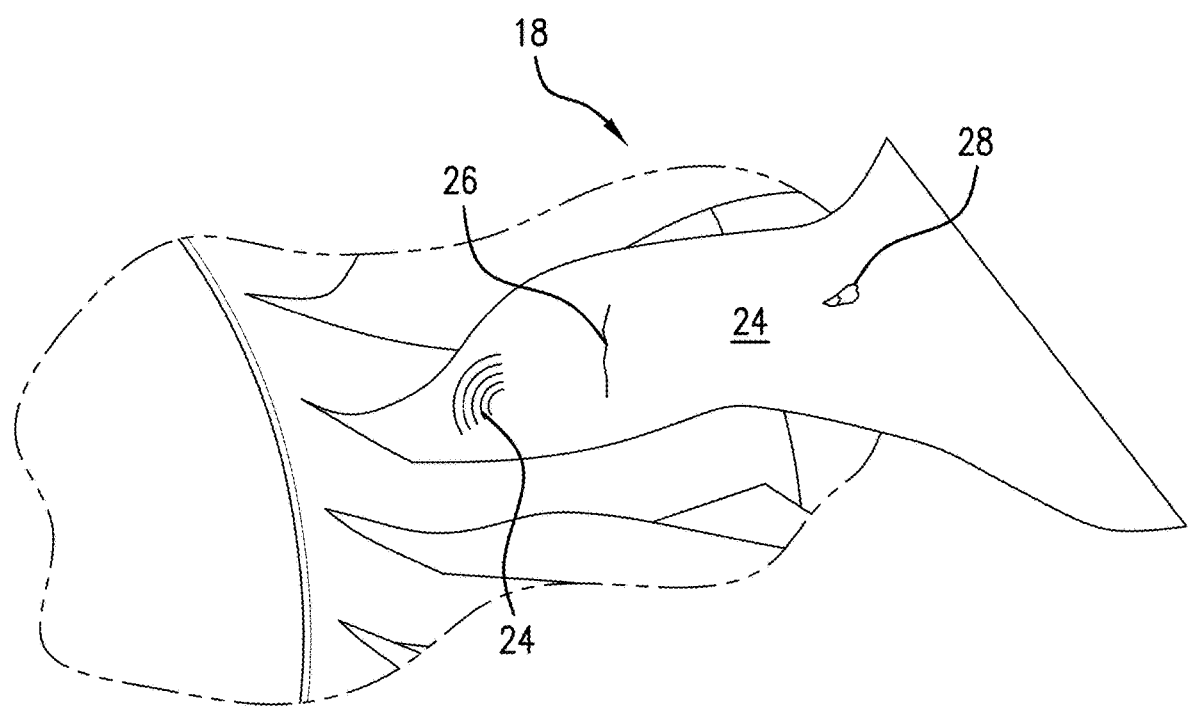
FIG. 2 is a close-up or magnified view of the surface topology of a damaged fan blade of a gas turbofan engine.

FIG. 2 is a close-up or magnified view of the surface topology of a damaged fan blade of a gas turbofan engine. In FIG. 2, a close-up or magnified view of surface 24 of airfoil 18 is shown. Such a close-up or magnified view depicts micro defects in surface 24 of airfoil 18. If not remedied, such micro defects (e.g., hairline scratches, surface cracks, etc.) can develop in time and lead to catastrophic damage to airfoil 18. Such remedies can include polishing surface 24, filling and polishing the damaged area(s), and or replacing airfoil 18. Such micro defects can be hard to see with the unaided eye. Moreover, inspection of a set of airfoils 18 can be time consuming if done by hand. Inspection of a set of airfoils 18 can be expeditiously performed, however, if done by a plurality of autonomous devices 20. Such expedience can result from simultaneous inspection of multiple airfoils 18.

To perform such an inspection of the surface topology of airfoil 18, these autonomous devices 20 should be sized appropriately 13 their lateral dimensions should be less that lateral dimensions of airfoil 18 at inspection locations, and their height (above airfoil 18) should be less than the space available between adjacent airfoils 18 at such inspection locations. These small autonomous devices 20 can then be deployed as a swarm, so as to quickly and autonomously inspect a plurality of airfoils 18. Their construction should also be light, consisting of relatively soft materials so that if lost, autonomous device 20 would pass through and disintegrate in the engine while it is in operation causing no damage to the engine. These small autonomous devices 20 should also be light so as to be able to maintain coupling with irregularly shaped airfoils 18. Without adequate coupling, such autonomous devices 20 could fall from airfoils 18 before inspection has been completed. Moreover, such falls could damage sensitive components of these small autonomous devices 20. Because these autonomous devices 20 are small, they can be equipped with only limited computing power. Thus, the algorithms used to inspect and/or map the surface topology should be such that they can be performed in-situ in real time using the computing power available to such small autonomous devices 20. The airfoil contacting members can be designed specifically to simplify the computational requirements for performing image analytics.

Figure 3A:
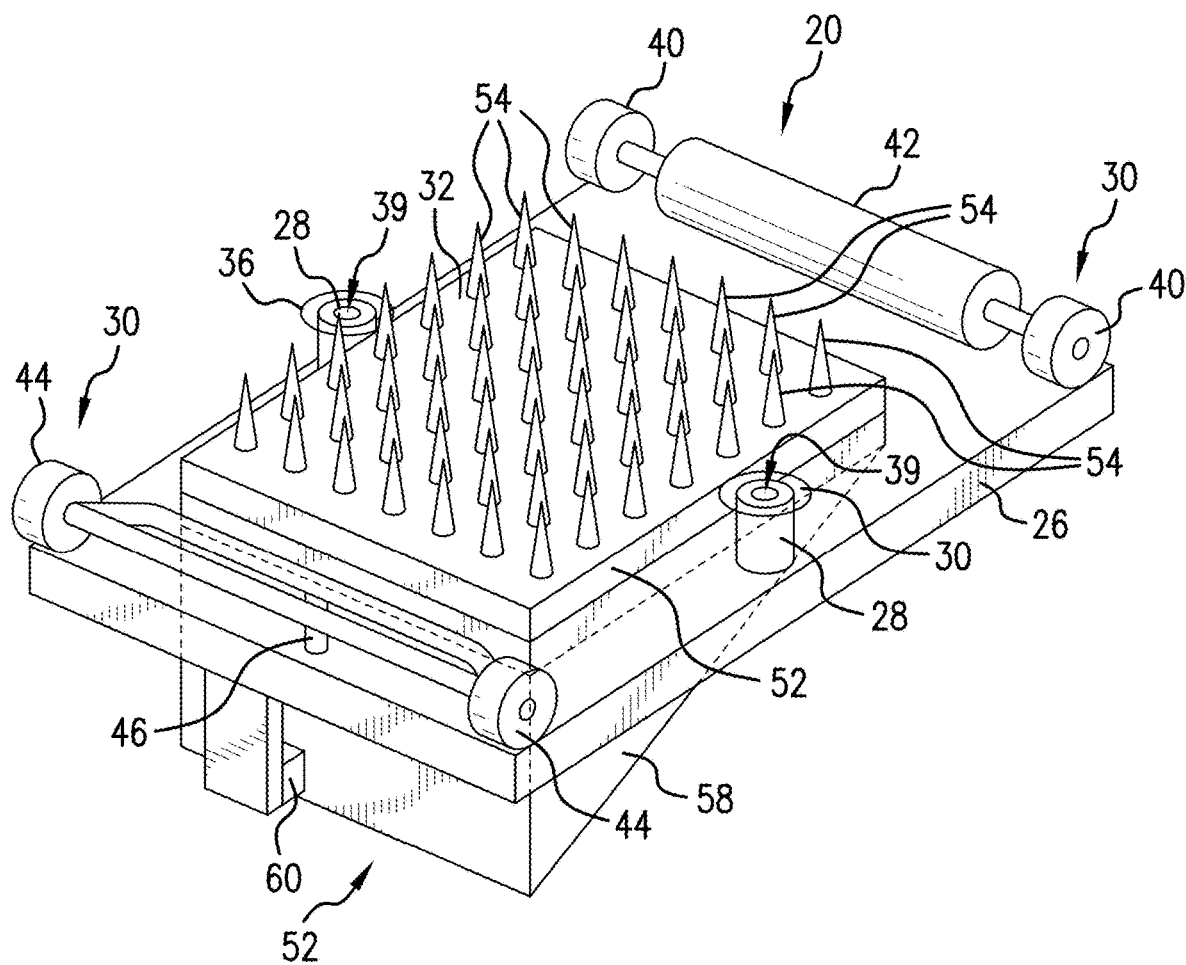
FIGS. 3A and 3B are a perspective view and a block diagram, respectively, of an embodiment of an autonomous device configured inspecting surface topology of an airfoil of a gas turning engine.
Figure 3B:
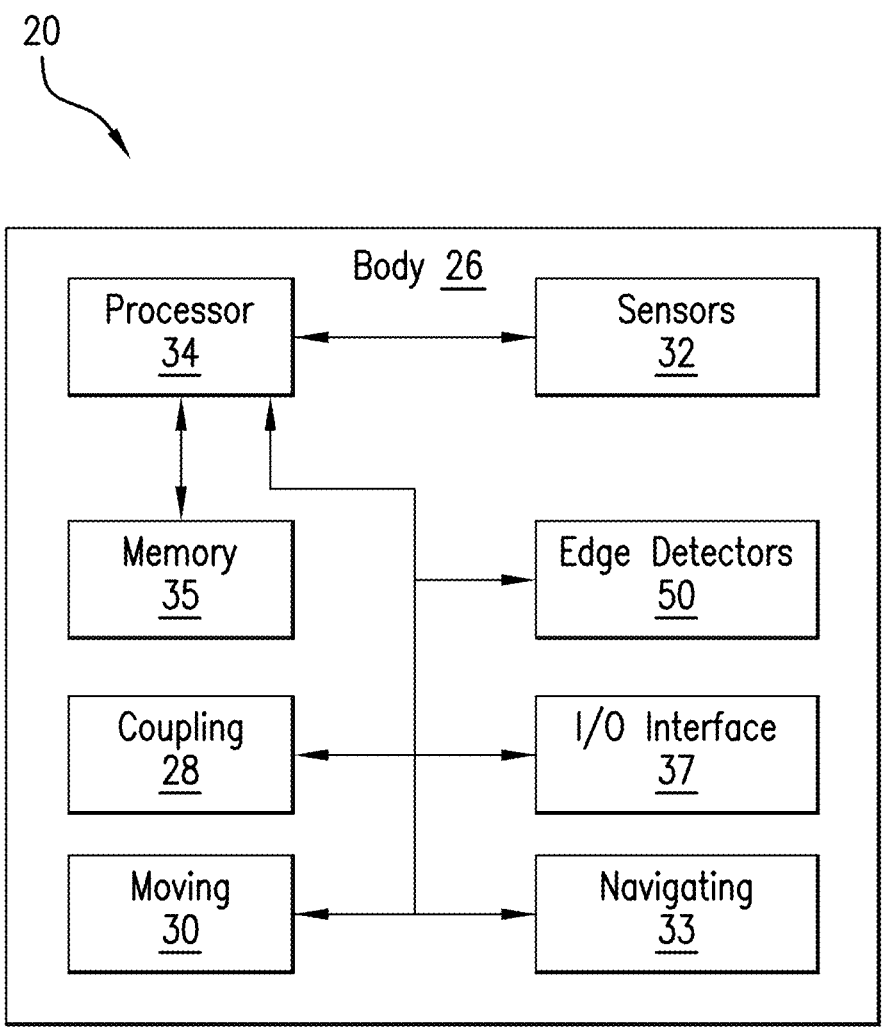

FIGS. 3A and 3B are a perspective view, and a block diagram, respectively, of an embodiment of an autonomous device configured inspecting surface topology of an airfoil of a gas turning engine. In FIG. 3A, autonomous device 20 includes body or base 26, means 28 for coupling the base to airfoil 18 in a manner that permits movement of base 26 across airfoil 18 while remaining coupled thereto. Autonomous device 20 also includes means 30 for moving base 26 across airfoil 18 while remaining coupled thereto. Autonomous device 20 also includes optical gel sensor 32, which is configured to determine surface topology of airfoil 18 when base 26 is coupled thereto. Autonomous device 20 also includes a processor (perhaps located on a topside of autonomous device 20, for example), which can be configured to generate a map of surface topology of airfoil 18, as well as controlling other functions of autonomous device 20, such as, for example, navigation, movement, image capture, image processing, etc. In the depicted embodiment, base 26 is a substantially planar base to which the various components 28, 30, 32 and the processor are all connected.

In the depicted embodiment, means 28 for coupling base 26 to airfoil 18 includes suction elements 36 and a vacuum pump (perhaps located on a topside of autonomous device 20, for example). Each of suction elements 36 have an evacuation chamber 39 that is created when each of suction elements 36 engages with airfoil 18. After each of suction elements 36 engages the surface of airfoil 18, evacuation of evacuation chamber 39 can commence. The vacuum pump can be configured to evacuate evacuation chambers 39, thereby causing the autonomous device to adhere to the surface of airfoil 18. Each of suction elements 36 is also configured to slidably move across the airfoil while maintaining vacuum in evacuation chamber 39 so as to adhere autonomous device 20 to airfoil 18 during movements thereacross. Although two suction elements 36 are depicted in the FIG. 3A embodiment, one or more than two such suction elements 36 can be used to couple autonomous device 20 to airfoil 18. For example, in some embodiments, a single suction element 36 circumscribing optical gen sensor 32 can provide means 28 for coupling base 26 to airfoil 18.

Various other means 28 for coupling base 26 to airfoil 18 can include a clip or a band that contacts both base 26 and a backside surface of airfoil 18, thereby providing a coupling force therebetween. In other embodiments, means 28 for coupling base 26 to airfoil 18 can include one or more contacting members that use a surface force and/or adhesion to provide coupling between base 26 and airfoil 18. For example, autonomous device 20 can have such adhering contacting surfaces at ends of legs 22 of autonomous device 20 of the embodiment depicted in FIG. 1. In such embodiments, contacting surfaces can be of a material or have coating that is tacky when in contact with surfaces 24 of airfoils 18. In another embodiment, contacting surfaces can provide a van der Waals attractive force with the surface of airfoils 18.

In the depicted embodiment, means 30 for moving autonomous device 20 across airfoil 18 include wheels 40 and motor 42. Wheels 40 extend from base 26 so as to engage the airfoil when base 26 is coupled thereto. Motor 42 is configured to rotate wheels 40, thereby moving the base across the airfoil when coupled thereto. In the depicted embodiment, means for steering autonomous device 20 as it moves across the airfoil include steerable wheel 44 and steering mechanism 46. A navigation computer (perhaps located on a topside of base 26) can be configured to control means 32 for steering autonomous device 20 and means 30 for moving autonomous device 20 across airfoil 18 so as to inspect and/or map surface topology of a plurality of portions of airfoil 18. Various sensors, such as edge detectors 50 can be used to provide location information to a navigation computer so as to facilitate navigation of autonomous device 20 across airfoil 18 to which it is coupled. In some embodiments, the navigation computer can share a processor that is programmed to perform the various other operations (e.g., navigation, image analysis, etc.) for inspecting and/or mapping surface topology of airfoil 18.

Autonomous device 20 can have various other means for moving autonomous device 20 across airfoil 18. For example, autonomous device 20 can include articulated legs, as depicted in the FIG. 1 embodiment. In other embodiments, autonomous device 20 can have wheels as depicted in the FIG. 3A embodiment. Various other arrangements of wheels and/or legs can be used to move autonomous device 20 across airfoil 18. In other embodiments, means for moving autonomous device 20 across airfoil 18 can include a soft deformable robot body system.

Optical gel sensor 32 includes flexible optical gel 52, airfoil contacting members 54, lighting elements 56, prism 58, two-dimensional imager 60. In some embodiments, flexible optical gel 52 can be contained within a flexible member, such as an elastic containment vessel, with a nominal shape designed to permit contact with airfoil 18 across lateral dimensions of its nominal shape. Airfoil contacting members 54 are configured to span between flexible optical gel 52 and airfoil 18, thereby deforming flexible optical gel 52 at a contacting-member/gel interface (e.g., at a base of each airfoil contacting member 54) in response to changes in surface topology of airfoil 18. Such deformations of flexible optical gel 52 by the base can be indicative of surface topology image features of airfoil 18. Airfoil contacting members 54 can have various geometries. For example, each airfoil contacting member 54 can have a conic geometry, a pyramidal geometry, a cylindrical geometry, etc. The base of each airfoil contacting member 54 can have various shapes as well, such as for example, circular, triangular, square, rectangular, hexagonal, etc. Contacting tips of each airfoil contacting member 54 can be pointed, rounded, or flat.

Lighting elements 56 illuminate flexible optical gel 52 from opposite lateral ends of flexible optical gel 52. In some embodiments, fewer or more lighting elements 56 can be used in various configurations to illuminate flexible optical gel 52. Lighting elements 56 can be Light Emitting Diodes (LEDs), incandescent lamps, or various other types of illumination devices. Two-dimensional imager 60 is configured to capture images of flexible optical gel 52 as reflected by prism 58. Such images, as captured by two-dimensional imager 60, will have image features (e.g., geometrical artifacts) pertaining to each of airfoil contacting members 54. Each of such image features will be indicative of an image feature of the surface topology at a location where the corresponding airfoil contacting member 54 contacts airfoil 18.

Autonomous device 20, as depicted in FIG. 3B, also includes surface topology calculator 34 (e.g., a processor), which is attached to base 26 and electrically connected to optical gel sensor 52. Surface topology calculator 34 can be configured to determine a surface topology of airfoil 18, as depicted in FIGS. 1 and 2, based on the images captured by optical gel sensor 52. As described above, such captured images contain a distinct image feature pertaining to each of airfoil contacting members 54. When autonomous device 20 is stationed on a perfectly planar surface, the image features corresponding to the airfoil contacting members can be nearly identical to one another (e.g., such image features can be considered nominal image features with nominal geometrical artifacts). But when one of the image features pertains to an image contacting member 54 that is in contact with a defect of airfoil 18, such an image feature and its geometrical artifacts can be distorted with respect to the nominal image features with nominal geometrical artifacts.

Such distorted image features are indicative of the defect that caused such distortion. Autonomous device 20 can be configured to calculate metrics of each of the image features pertaining to airfoil contacting members 54. Such metrics can include, for example, size metrics and geometry metrics of each image feature. These metrics can be indicative of relative height, and angle of the topological surface of airfoil 18.

Because there are far fewer airfoil contacting members 54 than pixels in images captured by two-dimensional imager 60, surface topology calculator can make use of computers of much less computing power than might be needed to perform image analytics across the entire images captured by two-dimensional imager 60. For example, the image features can be identified by segmentation (e.g., thresholding). Then each image feature can be compared with a library of distorted and undistorted image features. An image feature can be selected from the library as being the nearest image feature to the image feature captured in the image. Then surface topology metrics associates with the selected library image feature can be reported as pertaining to the airfoil 18 at the location where the corresponding one of airfoil contacting members 54 produced such an image feature. The distortions in the image features caused by the deformations on flexible optical gel 52 can be analyzed with trained image analytics software to detect imperfections on airfoil 18. Surface topology calculator 34 can be configured to generate a map of the surface topology of airfoil 18 by determining the surface topology along each of a plurality of paths across or locations upon airfoil 18 taken by the plurality of topological sensors 32.

Surface topology calculator 34 can be configured to execute software, applications, and/or programs stored in computer-readable memory 35. Examples of surface topology calculator 34 can include one or more of a processor, a microprocessor, a controller, a digital signal processor (DSP), an application specific integrated circuit (ASIC), a field-programmable gate array (FPGA), or other equivalent discrete or integrated logic circuitry and the associated memory systems. In some embodiments, microprocessor 34 can include more than one processing core.

Computer-readable memory 35 is configured to store information and, in some examples, can be described as a computer-readable storage medium. In some examples, a computer-readable memory 35 can include a non-transitory medium. The term "non-transitory" indicates that the storage medium is not embodied in a carrier wave or a propagated signal. In certain examples, a non-transitory storage medium can store data that can, over time, change (e.g., in RAM or cache). In some examples, computer-readable memory 35 can include a temporary memory. As used herein, a temporary memory refers to a memory having a primary purpose that is not long-term storage. Computer-readable memory 35, in some examples, can include volatile memory. As used herein, a volatile memory refers to a memory that does not maintain stored contents when power to the computer-readable memory 35 is turned off. Examples of volatile memories can include random-access memories (RAM), dynamic random-access memories (DRAM), static random-access memories (SRAM), and other forms of volatile memories. In some examples, computer-readable memory 35 is used to store program instructions for execution by surface topology calculator 34. Computer-readable memory 35, in one example, is used by software or applications running on autonomous device 20 to temporarily store information during program execution.

Computer-readable memory 35, in some examples, also includes one or more computer-readable storage media. The memory can be configured to store larger amounts of information than volatile memory. The memory can further be configured for long-term storage of information. In some examples, the memory includes non-volatile storage elements. Examples of such non-volatile storage elements can include, for example, magnetic hard discs, optical discs, floppy discs, flash memories, or forms of electrically programmable memories (EPROM) or electrically erasable and programmable (EEPROM) memories.

Input/output interface 37 is an input and/or output device and enables autonomous device 20 to receive data from an external source or operator and/or to report the results of inspecting airfoil 18 by autonomous device 20. For example, input/output interface 37 can be configured to receive inputs (e.g., configuration data) from an operator and/or provide outputs related to surface topology of airfoil 18. Input/output interface 37 can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, or other classification of device for facilitating input and/or output of information in a form understandable to users and/or machines. In some embodiments, input/output interface 37 is a network interface. For example, input/output interface 37 can include a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB). In other embodiments, input/output interface 37 can be a custom network interface.

Figure 4:
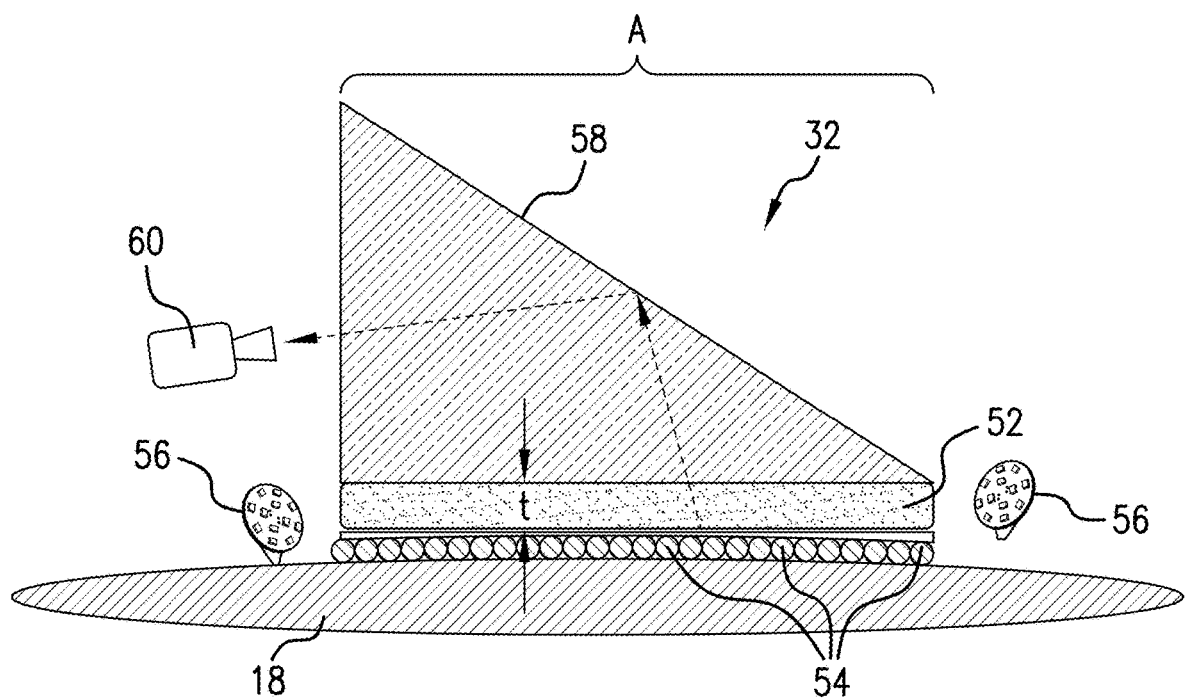
FIG. 4 is a side-elevation view of an example of an optical gel sensor sensing surface topology of an airfoil.

FIG. 4 is a side-elevation view of an example of an optical gel sensor sensing surface topology of an airfoil. In FIG. 4, optical gel sensor 32 includes flexible optical gel 52, a plurality of airfoil contacting members 54, lighting elements 56, prism or mirror 58 two-dimensional imager 60. As in the FIG. 3A embodiment, optical gel sensor 32 is configured to capture imagery containing image features indicative of surface topology of airfoil 18. Flexible optical gel 52 can be captured in an elastic containment vessel having nominally planar opposite surfaces 62 and 64 defining a nominal gel thickness t extending over image area A. In some embodiments, the elastic containment vessel includes an elastic membrane that extends from a planar glass surface so as to contain flexible optical gel 52 within a volume created by the planar glass surface and the elastic membrane. In other embodiments, flexible optical gel 52 needs no separate containment vessel to maintain its physical integrity (i.e., nominal shape). Typically, flexible optical gel is translucent or transparent so as to transmit light therethrough.

Airfoil contacting members 54 extend between flexible optical gel 52 and airfoil 18 when base 26 of the autonomous device is coupled thereto, thereby providing local deformations of the thickness $t(x, y)$ of flexible optical gel 52 in response to changes in the surface topology of the airfoil as base 26 moves thereacross. In the depicted embodiment, airfoil contacting members 54 are arranged in a regular two-dimensional array, with each of the plurality of airfoil contacting members 54 having a spherical shape (e.g., like a ball bearing). Typically, the height of each of the airfoil contacting members 54 is greater than a distance of separation between flexible optical gel 52 and airfoil 18. Because of this distance relationship, each of the airfoil contacting members 54 deform the thickness $t(x, y)$ of flexible optical gel 52 in such a manner corresponding to a geometric shape of a base (or gel-contacting portion) of the airfoil contacting member 52 (e.g., circular, in the FIG. 4 embodiment). Although airfoil contacting members 54 are depicted as spheres in the FIG. 4 embodiment, various other geometries can be used for contacting airfoil 18, as was explained above.

Lighting elements 56 illuminate flexible optical gel 52 from one or more ends of flexible optical gel 52. Lighting elements 56 is the source of illumination for images that are captured by two-dimensional imager 60. As seen by two-dimensional imager 60, color and/or intensity of the light illuminating flexible optical gel 52 changes in response to changes in thickness t(x, y) of flexible optical gel 52. Two-dimensional imager 60 is configured to image an imaging area of one of substantially-planar opposite surfaces 62 or 64 of flexible optical gel 52. Imaging of one of substantially-planar opposites surfaces 62 or 64 can be performed with or without use of prism 58 (or mirror 58). In the depicted embodiment, prism 58 permits two-dimensional imager 60 to be located at one side of the imaging area A of flexible optical gel 52. In other embodiments, two-dimensional imager 60 can be located directly above the imaging area A of flexible optical gel 52.

Various other embodiments include various analogous components. For example, as described above, various types of airfoil contacting members 54 can be used. Regardless of the specific type of airfoil contacting member 54 (e.g., spherical, cylindrical, conical, pyramidal, etc.) that communicates a height of the topological surface of airfoil 18 to flexible optical gel 52, each of airfoil contacting members 54 cause local deformation to the thickness t(x, y) of flexible optical gel. Such local deformation corresponds to a geometrical shape of the base of airfoil contacting members 54 as well as metrics of the topological surface of airfoil 18. For example, the relative height of the topological surface causes the airfoil contacting members 54 to press into or pull away from flexible optical gel 52. The relative height is the height $h(x_m, y_m)$ of the surface at the location of contact $(x_m, y_m)$ with airfoil contacting members 54m with respect to heights $h(x_n, y_n)$ of the surface at locations of contact $(x_n, y_n)$ with other contacting members 54n around airfoil contacting members 54m. Also, the angle of a normal vector $v(x_m, y_m)$ to topological surface of airfoil 18 at the location of contact $(x_m, y_m)$ can cause airfoil contacting members 54m to tilt with respect to a nominal axis from which airfoil contacting members 54m extends from flexible optical gel 52.

These metrics cause distinct changes to the deformation the thickness $t(x_m, y_m)$ of flexible optical gel 52. These distinctly different deformations, in turn cause geometrical artifacts in the images captured by two-dimensional imager 60. Various metrics of the geometrical artifacts are indicative of the relative height of and the normal vector to the topological surface of airfoil 18. For example, the area of the geometrical artifact can be indicative of the relative height of the topological surface of airfoil 18. In some embodiments, measures of eccentricity (e.g., ration of major axis to minor axis and angle of major and/or minor axes) of the geometrical artifact can be indicative of the vector normal to the topological surface of airfoil 18.

Figure 5A:
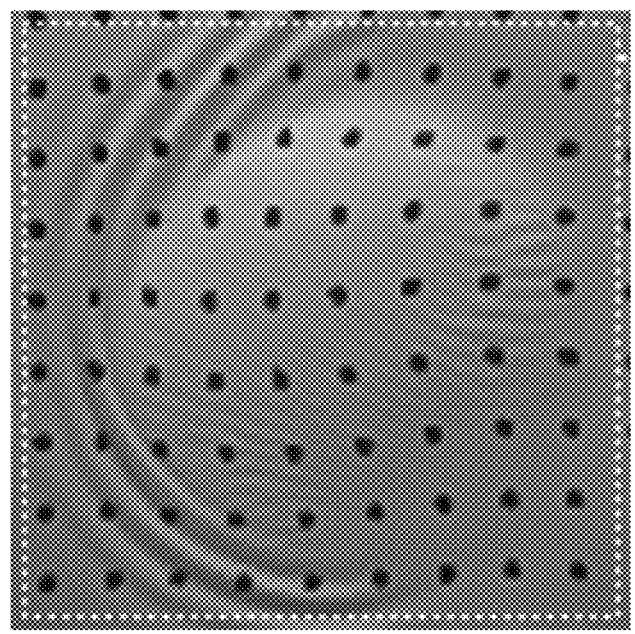
FIGS. 5A and 5B are example images of topology data of an airfoil that is obtained by an optical gel sensor.
Figure 5B:
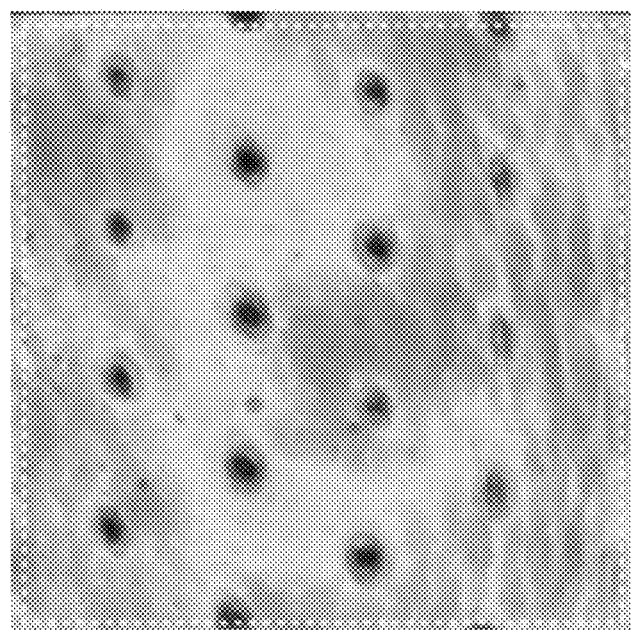

FIGS. 5A and 5B are example images of topology data of an airfoil that is obtained by an optical gel sensor. FIG. 5A is an image taken by two-dimensional imager 60 of optical gel sensor 32 over a human fingertip. FIG. 5B is an image taken by two-dimensional imager 60 of optical gel sensor 32 over a piece of cow leather. In both FIGS. 5A and 5B, various image features or geometrical artifacts a(x, y) are depicted. Each of geometrical artifacts a(x, y) corresponds to one of airfoil contacting members 54. Metrics of these geometrical artifacts a(x, y) are indicative of the topological surface of the human fingertip. Determining metrics of these geometrical artifacts a(x, y) requires much less computing power that performing analytics on the full two-dimensional images taken by two-dimensional imager 60. Because autonomous devices 20 are small, the computing power of processors 34 can be limited. Thus, determining metrics of such geometrical artifacts a(x, y) enables such autonomous devices 20 to inspect and/or map the surface topologies of the various airfoils of gas turbine engines.

Discussion of Possible Embodiments

The following are non-exclusive descriptions of possible embodiments of the present invention.

Apparatus and associated methods relate to a an autonomous device for inspecting surface topology of an airfoil of a gas turbine engine. The autonomous device includes a base and means for coupling the base to the airfoil in a manner that permits movement of the base across the airfoil while remaining coupled thereto. The autonomous device includes means for moving the base across the airfoil while remaining coupled thereto. The autonomous device includes a tactile gel sensor extending from the base to the airfoil when the base is coupled thereto. The tactile gel sensor has a flexible optical gel having nominally planar opposite surfaces defining a nominal gel thickness extending over an image area. The tactile gel sensor has a lighting element configured to illuminate the flexible optical gel from an end surface between the nominally planar opposite surfaces of the flexible optical gel. The tactile gel sensor has a plurality of airfoil contacting member extending between one of the nominally planar opposite surfaces of the flexible optical gel and the airfoil when the base is coupled thereto, thereby distorting the flexible optical gel in response to changes in the surface topology of the airfoil. The tactile gel sensor also has a two-dimensional imager that captures images of the flexible optical gel over the image area, thereby creating a two-dimensional image. The autonomous device also has a surface topology calculator attached to the base and electrically connected tactile gel sensor and configured to locate defects in the surface topology of the airfoil based on the images captured by the tactile gel sensor.

The system of the preceding paragraph can optionally include, additionally and/or alternatively, any one or more of the following features, configurations and/or additional components:

A further embodiment of the foregoing system, wherein each of the plurality of airfoil contacting member can cause a geometrical artifact to be imaged at a corresponding pixel region within each of the two-dimensional images captured by the two-dimensional imager, the geometrical artifact being indicative of the surface topology at a location where the airfoil contacting member contacts the airfoil.

A further embodiment of any of the foregoing systems, wherein the surface topology calculator can be trained to associate each of the geometrical artifacts with a surface condition or surface image features within a library of surface conditions or surface image features.

A further embodiment of any of the foregoing systems, wherein the surface topology calculator can determine surface topology at a location where the airfoil contacting member contacts the airfoil based on a metrics of the geometrical artifacts.

A further embodiment of any of the foregoing systems, wherein a nominal shape of the geometrical artifacts can be a circle.

A further embodiment of any of the foregoing systems, wherein the shape of the geometrical artifact can a circle in response to the plurality of airfoil contacting members contacting a planar surface parallel to the surface of the nominally planar surface of the flexible optical gel.

A further embodiment of any of the foregoing systems, wherein the geometrical artifact can become non-circular in response to the airfoil contacting member contacting a defect in the airfoil.

A further embodiment of any of the foregoing systems, wherein an angle of a major or minor axis of the non-circular elliptical geometrical artifact can be indicative of an orientation of the defect in the airfoil.

A further embodiment of any of the foregoing systems, wherein the means for coupling the base to the airfoil can use contacting member that couples the base to the airfoil using van der Waals force.

A further embodiment of any of the foregoing systems, wherein the means for coupling the base to the airfoil can include: a sealing element circumscribing an evacuation chamber, the sealing element configured to engage the surface of the airfoil; and a vacuum pump configured to evacuate the evacuation chamber, thereby causing the autonomous device to adhere to the surface of the airfoil.

A further embodiment of any of the foregoing systems, wherein the means for moving the base across the airfoil can include: a wheel extending from the base so as to engage the airfoil when the base is coupled thereto; and a motor configured to rotate the wheel, thereby moving the base across the airfoil when coupled thereto.

A further embodiment of any of the foregoing systems, wherein the means for moving the base across the airfoil can include: an arm or leg that sequentially positions itself so as to engage the airfoil and, using static friction, pushes or pulls the base across the airfoil when coupled thereto.

A further embodiment of any of the foregoing systems can further include means for steering the base as it moves across the airfoil.

A further embodiment of any of the foregoing systems can further include edge sensors that sense the edge of the airfoil.

A further embodiment of any of the foregoing systems can further include: a navigation computer configured to control the means for steering the base and the means for moving the base across the airfoil so as to map the surface topology of the airfoil.

A further embodiment of any of the foregoing systems, wherein the navigation computer can be configured to cause the base to move across the airfoil in a serpentine fashion.

A further embodiment of any of the foregoing systems, wherein each of the plurality of airfoil contacting members can be a ball bearing.

A further embodiment of any of the foregoing systems, wherein each of the plurality of airfoil contacting members can have a pointed tip configured to contact the airfoil.

Some embodiments relate to a method for inspecting surface topology of an airfoil of a gas turbine engine. The method includes adhering a base of an autonomous device to the airfoil in a manner that permits movement of the base across the airfoil while remaining coupled thereto. Then, the base of the autonomous device is moved across the airfoil while remaining coupled thereto. A tactile gel sensor extends from the base to the airfoil when the base is coupled thereto. The tactile gel sensor provides a flexible optical gel having nominally planar opposite surfaces defining a nominal gel thickness extending over an image area. A plurality of airfoil contacting members (e.g., feelers) extend between one of the nominally planar opposite surfaces of the flexible optical gel and the airfoil when the base is coupled thereto. A lighting element illuminates the flexible optical gel from an end surface between the nominally planar opposite surfaces of the flexible optical gel. The flexible optical gel is distorted in response to changes in the surface topology of the airfoil as transmitted to the flexible optical gel via the plurality of airfoil contacting members. The flexible optical gel is imaged over the image area by a two-dimensional optical imager, thereby capturing two-dimensional images. Then, defects in the surface topology of the airfoil are located by a surface topology calculator based on the two-dimensional images captured.

The method of the preceding paragraph can optionally include, additionally and/or alternatively, any one or more of the following features, configurations and/or additional components:

A further embodiment of the foregoing method, wherein each of the plurality of airfoil contacting member can cause a geometrical artifact to be imaged at a corresponding pixel region within the two-dimensional image created by the two-dimensional imager, the shape of the geometrical artifact being indicative of the surface topology at a location where the airfoil contacting member contacts the airfoil.

A further embodiment of any of the foregoing methods, wherein the surface topology calculator can determine surface topology at a location where the airfoil contacting member contacts the airfoil based on a metric of the geometrical artifact.

The invention disclosed herein is not limited to the implementations described but can be practiced with modification and alteration without departing from the scope of the appended claims. Although other embodiments may include not only the specific combinations of image features disclosed above but may also include undertaking only a subset of such image features, undertaking a different order of such image features, undertaking a different combination of such image features, and/or undertaking additional image features than those image features explicitly listed. The scope of the invention should, therefore, be determined with reference to the appended claims, along with the full scope of equivalents to which such claims are entitled.

The invention claimed is:

1. An autonomous device for inspecting surface topology of an airfoil of a gas turbine engine, the autonomous device comprising:
   a base;
   means for coupling the base to the airfoil in a manner that permits movement of the base across the airfoil while remaining coupled thereto;
   means for moving the base across the airfoil while remaining coupled thereto;
   a tactile gel sensor extending from the base to the airfoil when the base is coupled thereto, the tactile gel sensor including:
      a flexible optical gel having nominally planar opposite surfaces defining a nominal gel thickness extending over an image area;
      a lighting element configured to illuminate the flexible optical gel from an end surface between the nominally planar opposite surfaces flexible optical gel;
      a plurality of airfoil contacting members extending between one of the nominally planar opposite surfaces of the flexible optical gel and the airfoil when the base is coupled thereto, thereby distorting the flexible optical gel in response to changes in the surface topology of the airfoil; and
      a two-dimensional imager that images the flexible optical gel over the image area, thereby capturing two-dimensional images; and
   a surface topology calculator attached to the base and electrically connected tactile gel sensor and configured to locate defects in the surface topology of the airfoil based on the two-dimensional images captured by the two-dimensional imager.

2. The autonomous device of claim 1, wherein each of the plurality of airfoil contacting member causes a geometrical artifact to be imaged at a corresponding pixel region within each of the two-dimensional images captured by the two-dimensional imager, the geometrical artifact being indicative of the surface topology at a location where the airfoil contacting member contacts the airfoil.

3. The autonomous device of claim 2, wherein the surface topology calculator is trained to associate each of the geometrical artifacts with a surface condition or surface image features within a library of surface conditions or surface image features.

4. The autonomous device of claim 2, wherein the surface topology calculator determines surface topology at a location where the airfoil contacting member contacts the airfoil based on a metrics of the geometrical artifacts.

5. The autonomous device of claim 4, wherein a nominal shape of the geometrical artifacts is a circle.

6. The autonomous device of claim 5, wherein the shape of the geometrical artifact is a circle in response to the plurality of airfoil contacting members contacting a planar surface parallel to the surface of the nominally planar surface of the flexible optical gel.

7. The autonomous device of claim 5, wherein the geometrical artifact becomes non-circular in response to the airfoil contacting member contacting a defect in the airfoil.

8. The autonomous device of claim 7, wherein an angle of a major or minor axis of the non-circular elliptical geometrical artifact is indicative of an orientation of the defect in the airfoil.

9. The autonomous device of claim 1, wherein the means for coupling the base to the airfoil uses contacting member that couples the base to the airfoil using van der Waals force.

10. The autonomous device of claim 1, wherein the means for coupling the base to the airfoil includes:
a sealing element circumscribing an evacuation chamber, the sealing element configured to engage the surface of the airfoil; and
a vacuum pump configured to evacuate the evacuation chamber, thereby causing the autonomous device to adhere to the surface of the airfoil.

11. The autonomous device of claim 1, wherein the means for moving the base across the airfoil includes:
a wheel extending from the base so as to engage the airfoil when the base is coupled thereto; and
a motor configured to rotate the wheel, thereby moving the base across the airfoil when coupled thereto.

12. The autonomous device of claim 1, wherein the means for moving the base across the airfoil includes:
an arm or leg that sequentially positions itself so as to engage the airfoil and, using static friction, pushes or pulls the base across the airfoil when coupled thereto.

13. The autonomous device of claim 1 further comprising:
means for steering the base as it moves across the airfoil.

14. The autonomous device of claim 13 further comprising:
edge sensors that sense the edge of the airfoil.

15. The autonomous device of claim 14 further comprising:
a navigation computer configured to control the means for steering the base and the means for moving the base across the airfoil so as to map the surface topology of the airfoil.

16. The autonomous device of claim 15, wherein the navigation computer is configured to cause the base to move across the airfoil in a serpentine fashion.

17. The autonomous device of claim 1, wherein each of the plurality of airfoil contacting members is a ball bearing.

18. The autonomous device of claim 1, wherein each of the plurality of airfoil contacting members has a pointed tip configured to contact the airfoil.

19. A method for inspecting surface topology of an airfoil of a gas turbine engine, the method comprising:
adhering a base of an autonomous device to the airfoil in a manner that permits movement of the base across the airfoil while remaining coupled thereto;
moving the base of the autonomous device across the airfoil while remaining coupled thereto;
extending a tactile gel sensor from the base to the airfoil when the base is coupled thereto, the tactile gel sensor:
providing a flexible optical gel having nominally planar opposite surfaces defining a nominal gel thickness extending over an image area;
extending a plurality airfoil contacting members between one of the nominally planar opposite surfaces of the flexible optical gel and the airfoil;
illuminating, via a lighting element, the flexible optical gel from an end surface between the nominally planar opposite surfaces of the flexible optical gel;
distorting the elastic containment vessel in response to changes in the surface topology of the airfoil as transmitted to the flexible optical gel via the plurality of airfoil contacting members; and
imaging, via a two-dimensional optical imager, the optical gel over the image area, thereby creating two-dimensional images; and
locating, via a surface topology calculator, defects in the surface topology of the airfoil based on the two-dimensional images.

20. The method of claim 19, wherein:
each of the plurality of airfoil contacting member causes a geometrical artifact to be imaged at a corresponding pixel region within the two-dimensional image created by the two-dimensional imager, the shape of the geometrical artifact being indicative of the surface topology at a location where the airfoil contacting member contacts the airfoil, and
the surface topology calculator determines surface topology at a location where the airfoil contacting member contacts the airfoil based on a metric of the geometrical artifact.

* * * * *